United States Patent
Roh et al.

(10) Patent No.: US 8,244,292 B2
(45) Date of Patent: Aug. 14, 2012

(54) APPARATUS AND METHOD FOR POWER DISTRIBUTION BY FREQUENCY ALLOCATION IN MULTI-FREQUENCY ALLOCATION BROADBAND WIRELESS COMMUNICATION SYSTEM

(75) Inventors: Kwan-Hee Roh, Hwaseong-si (KR); June Moon, Seoul (KR); Yong-Seok Kim, Suwon-si (KR); Soon-Young Yoon, Seoul (KR); Sung-Woo Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1129 days.

(21) Appl. No.: 12/035,753

(22) Filed: Feb. 22, 2008

(65) Prior Publication Data

US 2008/0205369 A1 Aug. 28, 2008

(30) Foreign Application Priority Data

Feb. 23, 2007 (KR) .................. 10-2007-0018234

(51) Int. Cl.
*H04B 7/00* (2006.01)
*H04B 7/185* (2006.01)
*H04W 72/00* (2009.01)
*H01Q 11/12* (2006.01)
*H04J 1/00* (2006.01)

(52) U.S. Cl. .............. 455/522; 455/453; 455/127.1; 370/318; 370/343

(58) Field of Classification Search .............. 455/522, 455/127.1, 450, 451, 452.1, 452.2, 453; 370/343, 370/318

See application file for complete search history.

(56) References Cited

U.S. PATENT DOCUMENTS

| | | | | |
|---|---|---|---|---|
| 5,530,917 A * | 6/1996 | Andersson et al. | ........... | 455/436 |
| 5,596,570 A * | 1/1997 | Soliman | ........... | 370/252 |
| 5,675,581 A * | 10/1997 | Soliman | ........... | 370/252 |
| 5,987,319 A * | 11/1999 | Hermansson et al. | ........... | 455/422.1 |
| 6,223,056 B1 * | 4/2001 | Appel | ........... | 455/561 |
| 6,347,231 B1 * | 2/2002 | Miya | ........... | 455/522 |
| 6,400,335 B1 * | 6/2002 | Weaver et al. | ........... | 343/853 |
| 6,792,276 B1 * | 9/2004 | Butovitsch et al. | ........... | 455/453 |
| 6,937,863 B1 * | 8/2005 | Gordon et al. | ........... | 455/446 |
| 6,963,750 B1 * | 11/2005 | Cheng et al. | ........... | 455/458 |
| 6,993,337 B2 * | 1/2006 | Rudrapatna et al. | ........... | 455/440 |
| 7,187,664 B2 * | 3/2007 | Hiltunen | ........... | 370/318 |
| 7,512,387 B2 * | 3/2009 | Glueck | ........... | 455/127.1 |
| 7,818,023 B2 * | 10/2010 | Li et al. | ........... | 455/522 |
| 2002/0061006 A1 * | 5/2002 | Soliman | ........... | 370/342 |
| 2002/0155854 A1 * | 10/2002 | Vanghi | ........... | 455/522 |

(Continued)

FOREIGN PATENT DOCUMENTS

KR 2002-0074756 A 10/2002

(Continued)

*Primary Examiner* — Christopher M Brandt
(74) *Attorney, Agent, or Firm* — Jefferson IP Law, LLP

(57) ABSTRACT

An apparatus and method for power distribution by Frequency Allocation (FA) in a multi-band broadband wireless communication system are provided. The method includes detecting at least one of a loading value and a performance efficiency value by band, calculating a power distribution value by band using the detected value and calculating a power value by band using the calculated band power distribution value. The method and apparatus provide a scheme that can vary a power distribution of each band according to need and cope with subscriber capacity more flexibly when a plurality of diverse systems coexist.

12 Claims, 4 Drawing Sheets

U.S. PATENT DOCUMENTS

| | | | |
|---|---|---|---|
| 2003/0153315 A1* | 8/2003 | Gunreben et al. | 455/445 |
| 2004/0213293 A1* | 10/2004 | Basso et al. | 370/480 |
| 2005/0089114 A1* | 4/2005 | Johansson et al. | 375/285 |
| 2005/0250527 A1* | 11/2005 | Jugl et al. | 455/522 |
| 2005/0281221 A1* | 12/2005 | Roh et al. | 370/328 |
| 2006/0234646 A1* | 10/2006 | Naguib et al. | 455/69 |
| 2006/0234751 A1* | 10/2006 | Horng et al. | 455/522 |
| 2006/0291414 A1* | 12/2006 | Lim et al. | 370/329 |
| 2007/0097935 A1* | 5/2007 | Gorokhov et al. | 370/338 |
| 2007/0140160 A1* | 6/2007 | Lee et al. | 370/329 |
| 2007/0238431 A1* | 10/2007 | Zhan et al. | 455/232.1 |
| 2007/0253385 A1* | 11/2007 | Li et al. | 370/338 |
| 2007/0270173 A1* | 11/2007 | Niu et al. | 455/522 |
| 2007/0293260 A1* | 12/2007 | Xiao et al. | 455/522 |
| 2008/0153429 A1* | 6/2008 | Johnson et al. | 455/72 |
| 2008/0188260 A1* | 8/2008 | Xiao et al. | 455/522 |
| 2009/0296574 A1* | 12/2009 | Liao et al. | 370/230 |

FOREIGN PATENT DOCUMENTS

| | | |
|---|---|---|
| KR | 10-2004-0063471 A | 7/2004 |
| KR | 10-2005-0048357 A | 5/2005 |

* cited by examiner

APPARATUS AND METHOD FOR POWER DISTRIBUTION BY FREQUENCY ALLOCATION IN MULTI-FREQUENCY ALLOCATION BROADBAND WIRELESS COMMUNICATION SYSTEM

PRIORITY

This application claims the benefit under 35 U.S.C. §119 (a) to a Korean patent application filed in the Korean Intellectual Property Office on Feb. 23, 2007 and assigned Serial No. 2007-18234, the entire disclosure of which is hereby incorporated by reference.

BACKGROUND OF THE INVENTION

1. Field of the Invention

The present invention relates generally to an apparatus and method for power distribution by Frequency Allocation (FA) in a multi-frequency allocation broadband wireless communication system. More particularly, the present invention relates to an apparatus and method for varying power distribution by FA in a broadband wireless communication system that includes a plurality of compatible systems, wherein each system distributes power by FA.

2. Description of the Related Art

In general, communication systems were developed for the purpose of providing voice service. Over time, communication systems have been further developed to provide data service and various multimedia services as well as voice service. However, because the communication systems that provide voice service have relatively narrow transmission bandwidths and require expensive service charges, they cannot adequately provide the additional services desired by users. Further, the necessity for a communication system to be capable of efficiently providing Internet service is increasing due to developments in the communication industry and the increasing demand by users for such service. To this end, broadband wireless communication systems for efficiently providing Internet service have been introduced.

A wireless access scheme for a broadband wireless communication system is being standardized by the 802.16 standardization group of Institute of Electrical and Electronics Engineers (IEEE), which is an international standardization organization. One wireless access scheme proposed by the 802.16 standardization group is the Orthogonal Frequency Division Multiplexing/Orthogonal Frequency Division Multiple Access (OFDM/OFDMA) scheme. When using the OFDM/OFDMA scheme, the broadband wireless communication system transmits a physical channel signal using a plurality of sub-carriers, thus enabling high-speed data transmission as needed for providing Internet service and the like.

In the meantime, communication systems are continuing to evolve and are providing high-speed data service, as compared to an existing system, by a modification of their specifications or by solving an issue in realization. In this evolution process, several diverse systems can coexist within the same area depending on the degree of compatibility between the existing systems. In particular, it can be considered that a plurality of systems can be concurrently served by one Base Station (BS). In this case, the systems each can divide and use part of the entire transmission band. As such, where power amplification for the entire transmission band is performed by one Power Amplifier (PA), there is a drawback of not being able to flexibly cope with a subscriber capacity of each system if power distribution by FA is not performed properly.

Thus, there is needed to provide a scheme that can vary a power distribution of each system according to need and cope with subscriber capacity more flexibly when diverse systems coexist within the same area.

SUMMARY OF THE INVENTION

An aspect of the present invention is to address at least the above-mentioned problems and/or disadvantages and to provide at least the advantages described below. Accordingly, one aspect of the present invention is to provide an apparatus and method for power distribution by Frequency Allocation (FA) in a multi-FA broadband wireless communication system.

Another aspect of the present invention is to provide an apparatus and method for varying power distribution by FA in a broadband wireless communication system supporting different systems that distribute power by FA.

A further aspect of the present invention is to provide an apparatus and method for varying a power distribution of each system and coping with a subscriber capacity more flexibly in an environment in which a diversity of systems coexist.

The above aspects are addressed by providing an apparatus and method for power distribution by FA in a multi-FA broadband wireless communication system.

According to one aspect of the present invention, a method for power distribution by FA in a multi-FA broadband wireless communication system is provided. The method includes detecting at least one of a loading value and a performance efficiency value, calculating an FA power distribution value using the detected value and calculating a power value for FA using the calculated FA power distribution value.

According to another aspect of the present invention, an apparatus for power distribution by FA in a multi-FA broadband wireless communication system is provided. The apparatus includes a controller and an FA power value calculator. The controller detects at least one of a loading value and a performance efficiency value. The power value calculator calculates an FA power distribution value using the detected value and calculates a power value for FA using the calculated FA power distribution value.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms described below, which are defined considering functions in the present invention, can be different depending on user and operator's intention or practice. Therefore, the terms should be defined on the basis of the disclosure throughout this specification.

As described below, exemplary embodiments of the present invention provide a scheme for varying power distribution by Frequency Allocation (FA), that is, by frequency band, in a broadband wireless communication system that includes a plurality of compatible systems, wherein each system distributes power per frequency band. In the description below, the plurality of systems with compatibility are systems using, for example an OFDM scheme or an OFDMA scheme. Further, exemplary embodiments of the present invention describe a three-band broadband wireless communication system. However, this is for example only and the present invention is also applicable to a two-band or four-or-more-band broadband wireless communication system.

First, terms used in the present invention are defined as follows.

Legacy: a system complying with existing specifications (e.g., IEEE 802.16e based system).

Strictly Backward Compatibility (SBC): an evolved system having compatibility with legacy system.

Loosely Backward Compatibility (LBC): an evolved system having minimum compatibility with legacy system.

More specifically, the SBC system is a system supporting the same specification as the legacy system (that is, without changing any mandatory items) and having improved performance as reflected by various service additions, service improvements and the like. The LBC system is a system that keeps a basic transmission architecture identical with the legacy system but has its own new specification. The LBC system can provide a service to legacy Mobile Stations (MSs) and LBC MSs. Accordingly, a new MS corresponding to an LBC system can be serviced with no difference from the service provided to a legacy MS within a legacy system.

Figure 1:
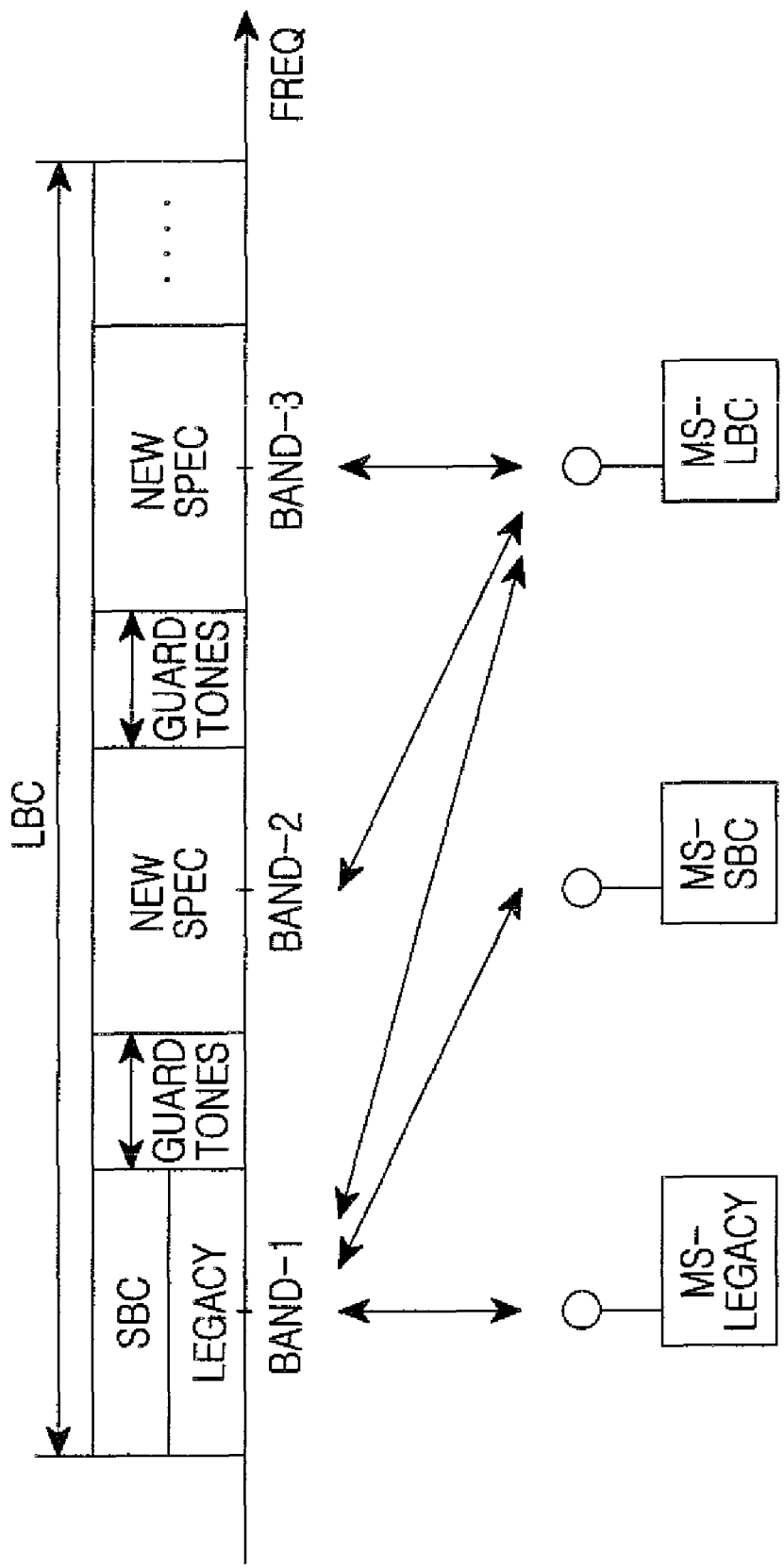
FIG. 1 is a diagram illustrating a Loosely Backward Compatible (LBC) band accepting an existing system and a new system according to an exemplary embodiment of the present invention.

In an exemplary embodiment as illustrated in FIG. 1, three transmission bands, Band-1, Band-2 and Band-3, are provided. An entire one of the three bands can be used for an existing specification and the remaining two bands may be used for a new specification. For example, an MS-Legacy and an MS-SBC can be serviced using an existing specification at Band-1. An MS-LBC can be serviced using the existing specification and the new specifications at an LBC band including each of Band-1, Band-2 and Band-3. That is, the MS-LBC can be separately operated at each of Band-1, Band-2 and Band-3. Alternatively, the MS-LBC can be concurrently operated in each of the bands.

A power distribution value to be allocated to a specific band can be calculated considering service coverage and subscriber capacity to be provided by a system, that is, the loading conditions of the system, and a performance efficiency of the system itself. An exemplary description of loading conditions and performance efficiency for each band is made as follows. Loading of each band is determined as a ratio of the radio resources used for overhead and user traffic transmission of a given band to the total available radio resources. The loading of each band has a value between 0 and 1. Performance efficiency of each band is determined by a Media Access Control (MAC) or physical (PHY) layer performance efficiency of a system itself and can be considered as a relative rate to a spectral efficiency value obtainable there from. For example, if an average spectral efficiency value of an LBC system that is the most evolved system is equal to 2 bps/Hz/cell and an average spectral efficiency value of an existing legacy system is equal to 1 bps/Hz/cell, performance efficiency values for the LBC and legacy systems are equal to 1 and 0.5, respectively.

Figure 2:
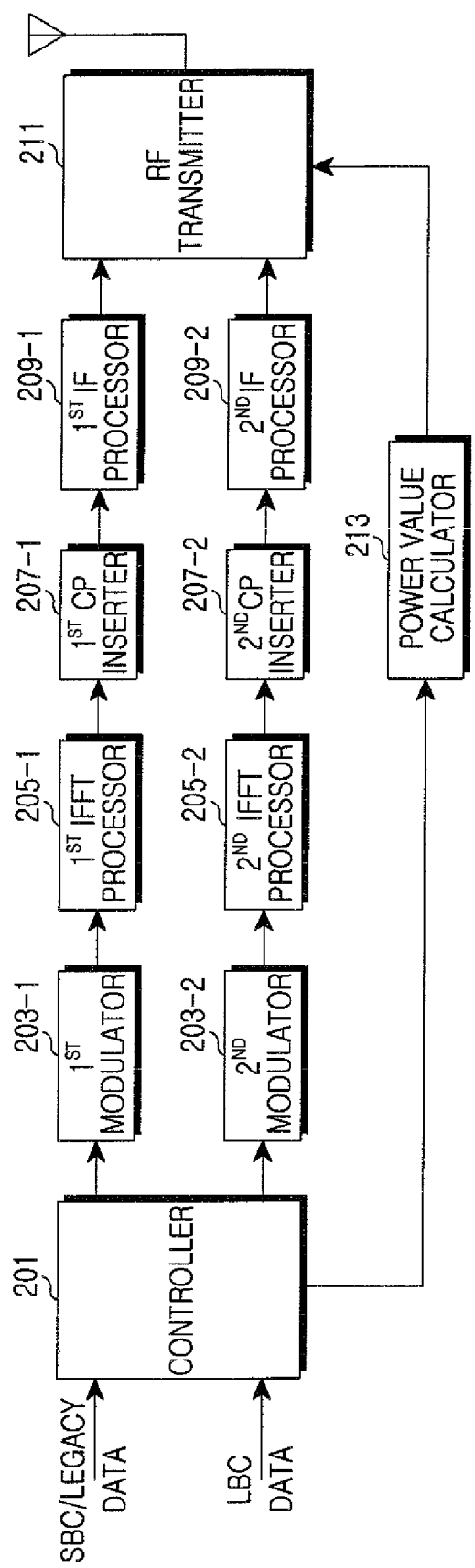
FIG. 2 is a block diagram illustrating a construction of a BS transmission apparatus in a multi-FA broadband wireless communication system according to an exemplary embodiment of the present invention.

FIG. 2 is a block diagram illustrating a construction of a BS transmission apparatus in a multi-band broadband wireless communication system according to an exemplary embodiment of the present invention.

As shown in FIG. 2, the BS transmission apparatus includes a controller 201, first and second modulators 203-1 and 203-2, first and second Inverse Fast Fourier Transform (IFFT) processors 205-1 and 205-2, first and second Cyclic Prefix (CP) inserters 207-1 and 207-2, first and second Intermediate Frequency (IF) processors 209-1 and 209-2, a Radio Frequency (RF) transmitter 211 and a power value calculator 213. The first modulator 203-1, the first IFFT processor 205-1, the first CP inserter 207-1, and the first IF processor 209-1 are related with a new specification. The second modulator 203-2, the second IFFT processor 205-2, the second CP inserter 207-2, and the second IF processor 209-2 are related with an existing specification. A new specification band signifies an LBC band and an existing specification band signifies a legacy/SBC band.

Referring to FIG. 2, the controller 201 receives existing specification band data and new specification band data, outputs data to be transmitted using the existing specification band from among the received data to the second modulator 203-2 related with the existing specification according to scheduling. The controller 201 also outputs data to be transmitted using the new specification band from among the received data to the first modulator 203-1 related with the new specification according to scheduling. The existing specification band data can be transmitted using only the existing specification band and the new specification band data can be transmitted using the existing specification band or the new specification band. The controller 201 detects and outputs loading conditions and performance efficiency by band to the power value calculator 213.

The first and second modulators 203-1 and 203-2 modulate the data received from the controller 201 in compliance with the corresponding specifications and output the modulated data to the IFFT processors 205-1 and 205-2 of corresponding specifications, respectfully.

The first and second IFFT processors 205-1 and 205-2 process the data received from the first and second modulators 203-1 and 203-2 by IFFT and output sample data to the first and second CP inserters 207-1 and 207-2 of the corresponding specifications. Also, the first and second IFFT processors 205-1 and 205-2 can perform IFFT for the entire band available to a BS using a multiple IFFT processor.

The first and second CP inserters 207-1 and 207-2 insert CPs into the sample data received from the IFFT processors 205-1 and 205-2 and output OFDM symbols to the IF processors 209-1 and 209-2 of the corresponding specifications.

The first and second IF processors 209-1 and 209-2 convert the OFDM symbols received from the CP inserters 207-1 and 207-2 into analog signals, convert the analog signals into IF signals and output the IF signals to the RF transmitter 211.

The RF transmitter 211 multiplexes signals of the bands received from the IF processors 209-1 and 209-2 of the new specification and the existing specification, that is, a signal of an existing specification band and a signal of a new specification band. The RF transmitter 211 converts the multiplexed signal into a signal of an RF band, applies a power value calculated for each band to the corresponding band of the RF band signal and amplifies the RF band signal and transmits the amplified signal through an antenna.

The power value calculator 213 calculates a power distribution value for a given band by using the loading conditions and performance efficiency of the corresponding band received from the controller 201, calculates a power value by for a given band by using the calculated band power distribution value of the corresponding band and outputs the calculated power value to the RF transmitter 211.

Figure 3:
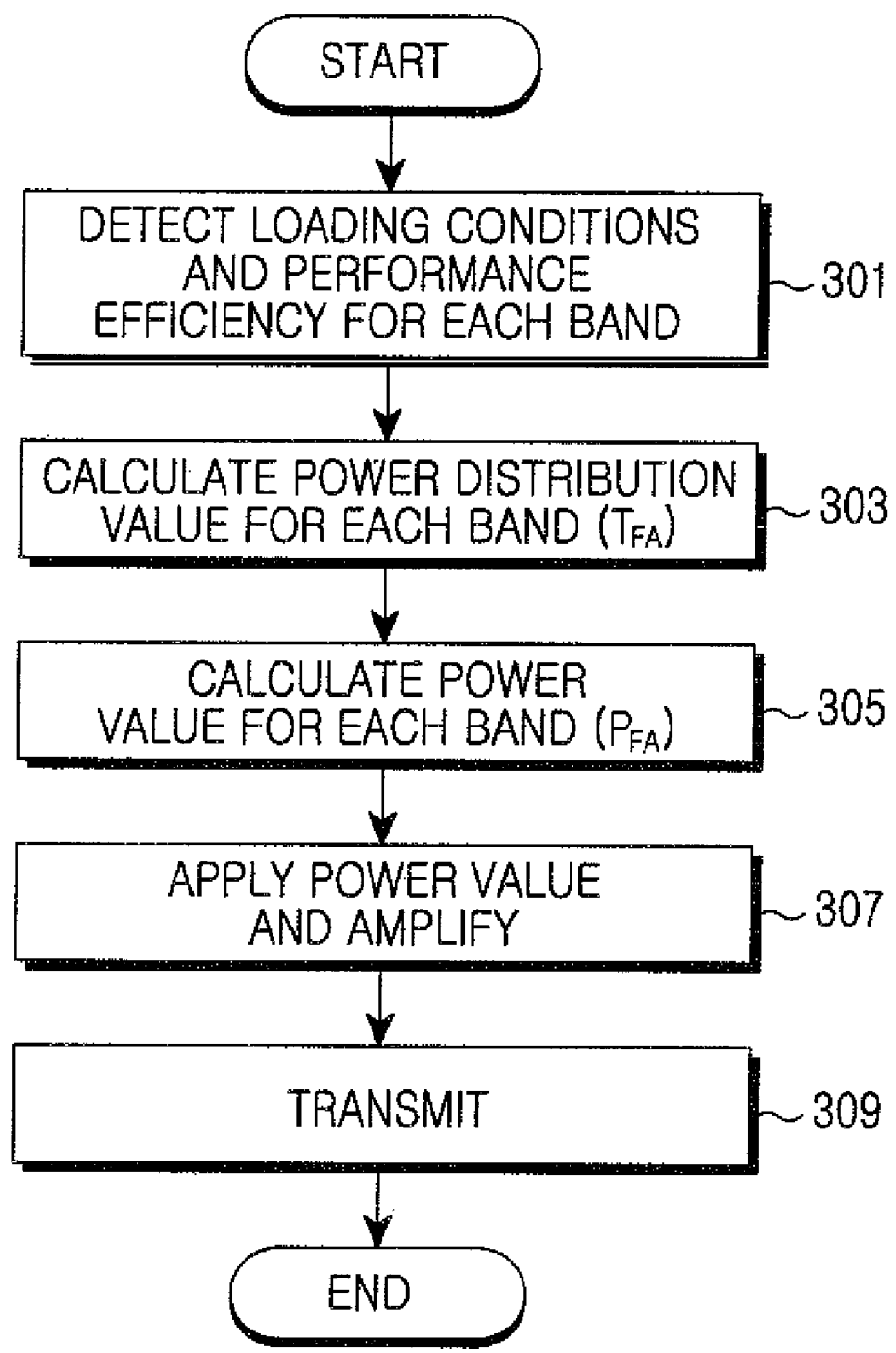
FIG. 3 is a flow diagram illustrating a method for power distribution by FA in a multi-FA broadband wireless communication system according to an exemplary embodiment of the present invention.

FIG. 3 is a flow diagram illustrating a method for power distribution of each band in a multi-band broadband wireless communication system according to an exemplary embodiment of the present invention.

Referring to FIG. 3, a BS detects loading conditions and performance efficiency for each band in step 301 and calculates a power distribution value for each band using the corresponding detected band loading conditions and performance efficiency in step 303.

For example, if loading and performance efficiency of each of Band-1, Band-2, and Band-3 are expressed as $\beta_{FA1}$, $\beta_{FA2}$, and $\beta_{FA3}$ and $\gamma_{FA1}$, $\gamma_{FA2}$, and $\gamma_{FA3}$, respectively, a band power distribution value ($T_{FA}$) for each band can be calculated in Equation 1 below:

$$T_{FA}=\beta\gamma \quad (1)$$

That is, the band power distribution value can be calculated by a product of the loading and the performance efficiency and has a value between '0' and '1'. Also, if either of the loading or performance efficiency has a value of '1', the band power distribution value can be calculated using only the other of the loading and performance efficiency.

Here, if the power distribution value of each band is defined as a rate of a power distribution value (T), it can be expressed in Equation 2 below:

$$T_{FA1}'=T_{FA1}/(T_{FA1}+T_{FA2}+T_{FA3})$$

$$T_{FA2}'=T_{FA2}/(T_{FA1}+T_{FA2}+T_{FA3})$$

$$T_{FA3}'=T_{FA3}/(T_{FA1}+T_{FA2}+T_{FA3}) \quad (2)$$

Thus, a relationship of $T_{FA1}'+T_{FA2}'+T_{FA3}'=1$ is established.

Then, the BS calculates a power value for each band (i.e. $P_{FA}$) using the calculated band power distribution value in step 305.

Here, if a capacity of a power amplifier (PA) is defined as 'P' and power allocated to each band is defined as $P_{FA1}$, $P_{FA2}$, or $P_{FA3}$, a power value of each band can be calculated through Equation 3 below:

$$P_{FA1}=P\times T_{FA1}', P_{FA2}=P\times T_{FA2}', P_{FA3}=P\times T_{FA3}' \quad (3)$$

Then, the BS amplifies data of each band using the corresponding calculated band power value in step 307 and transmits the amplified data in step 309.

Then, the BS terminates the process.

Figure 4A:
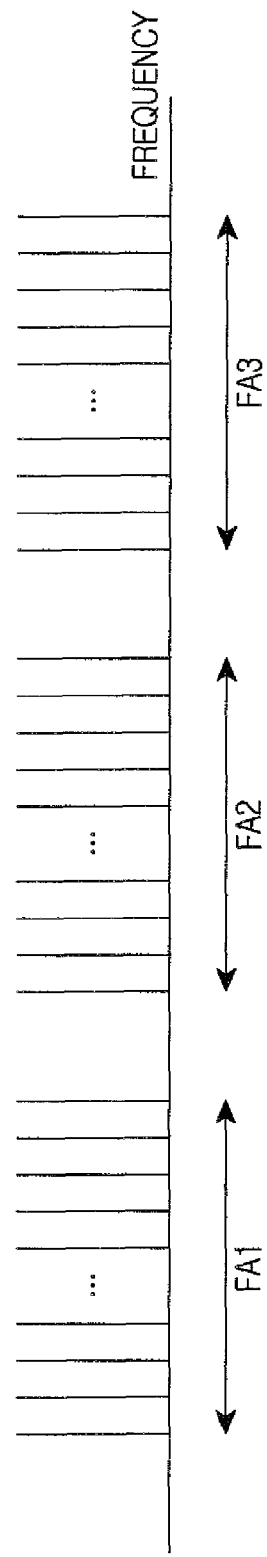
FIGS. 4A and 4B are diagrams illustrating power values according to the conventional art and an exemplary embodiment of the present invention.
Figure 4B:
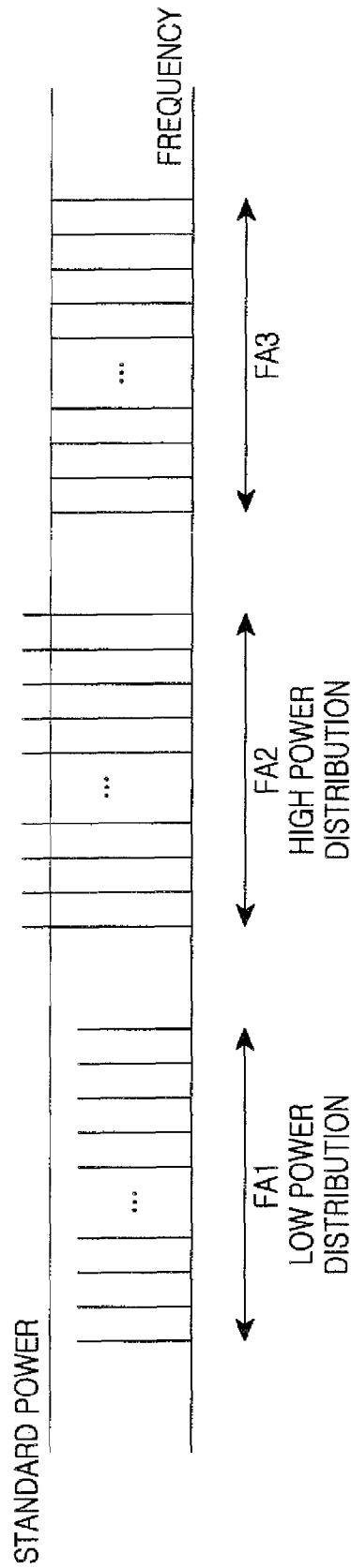

FIGS. 4A and 4B are diagrams illustrating power values of each band according to the conventional art and an exemplary embodiment of the present invention.

FIG. 4A shows that power values of each band according to the conventional art are the same. FIG. 4B shows that power values of each band as determined by applying an exemplary method of the present invention may be different from each other. For example, a power amplifier can change the power of a band (e.g. FA1) from $P_{FA1}$ to $P_{FA1}'$ if it is determined that the power of FA1 is higher than needed when considering loading conditions or performance efficiency by band of a system. Surplus power of $P_{FA1}-P_{FA1}'$ can be allocated to either or both of $P_{FA2}$ and $P_{FA3}$ according to need. By doing so, the capacity of the power amplifier need not be increased to satisfy demand.

Exemplary embodiments of the present invention can vary power distribution by band in a broadband wireless communication system supporting different systems that distribute power using FA, thereby distributing power flexibly depending on a subscriber capacity and thus increasing an efficiency of the use of power resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for power distribution by Frequency Allocation (FA) in a multi-band broadband wireless communication system, the method comprising:
   detecting, by a controller, at least one of a loading value and a performance efficiency value for each band in the communication system;
   calculating a power distribution value for each band using the corresponding detected value; and
   calculating a power value for each band using the corresponding calculated power distribution value,
   wherein the loading value comprises a ratio of radio resources used for overhead and user traffic transmission of a given band to total radio resources, and the performance efficiency value comprises a relative rate to a spectral efficiency value.

2. The method of claim 1, wherein the calculating of the power distribution value for each band comprises calculating a product of the corresponding loading value and the performance efficiency value for each band.

3. The method of claim 1, wherein the calculating of the power distribution value for each band comprises dividing the calculated power distribution value for each band by a total power distribution value of the multi-bands.

4. The method of claim 1, wherein the calculating of the power value for each band comprises calculating a product of a power distribution value of a corresponding band and a power amplifier capacity.

5. The method of claim 1, further comprising:
   applying the power value of a corresponding band to transmission data of the band and amplifying the transmission data by the power value; and
   transmitting the amplified data to a receiver.

6. The method of claim 1, wherein the broadband wireless communication system supports a system comprising at least two different specifications.

7. An apparatus for power distribution by Frequency Allocation (FA) in a multi-band broadband wireless communication system, the apparatus comprising:
a controller for detecting at least one of a loading value and a performance efficiency value for each band; and
a power value calculator for calculating a power distribution value for each band using the corresponding detected value and for calculating a power value for each band using the corresponding calculated power distribution value,
wherein the loading value comprises a ratio of radio resources used for overhead and user traffic transmission of a given band to total radio resources, and the performance efficiency value comprises a relative rate to a spectral efficiency value.

8. The apparatus of claim 7, wherein the power distribution value for each band is calculated by a product of the corresponding loading value and the performance efficiency value.

9. The apparatus of claim 7, wherein the power distribution value for each band used for calculating the corresponding power value for each band is a value obtained by dividing the calculated power distribution value for each band by a total power distribution value of the multi-bands.

10. The apparatus of claim 7, wherein the power value for each band is calculated by a product of a power distribution value of a corresponding band and a power amplifier capacity.

11. The apparatus of claim 7, further comprising a Radio Frequency (RF) transmitter for applying the power value of a corresponding band to transmission data of the band and amplifying the transmission data by the power value and for transmitting the amplified data to a receiver.

12. The apparatus of claim 7, wherein the broadband wireless communication system supports a system comprising at least two different specifications.

* * * * *